E. S. SNIVELY.
PASTEURIZED CREAM COOLER AND AERATOR.
APPLICATION FILED DEC. 18, 1909.
965,604.
Patented July 26, 1910.
2 SHEETS—SHEET 1.
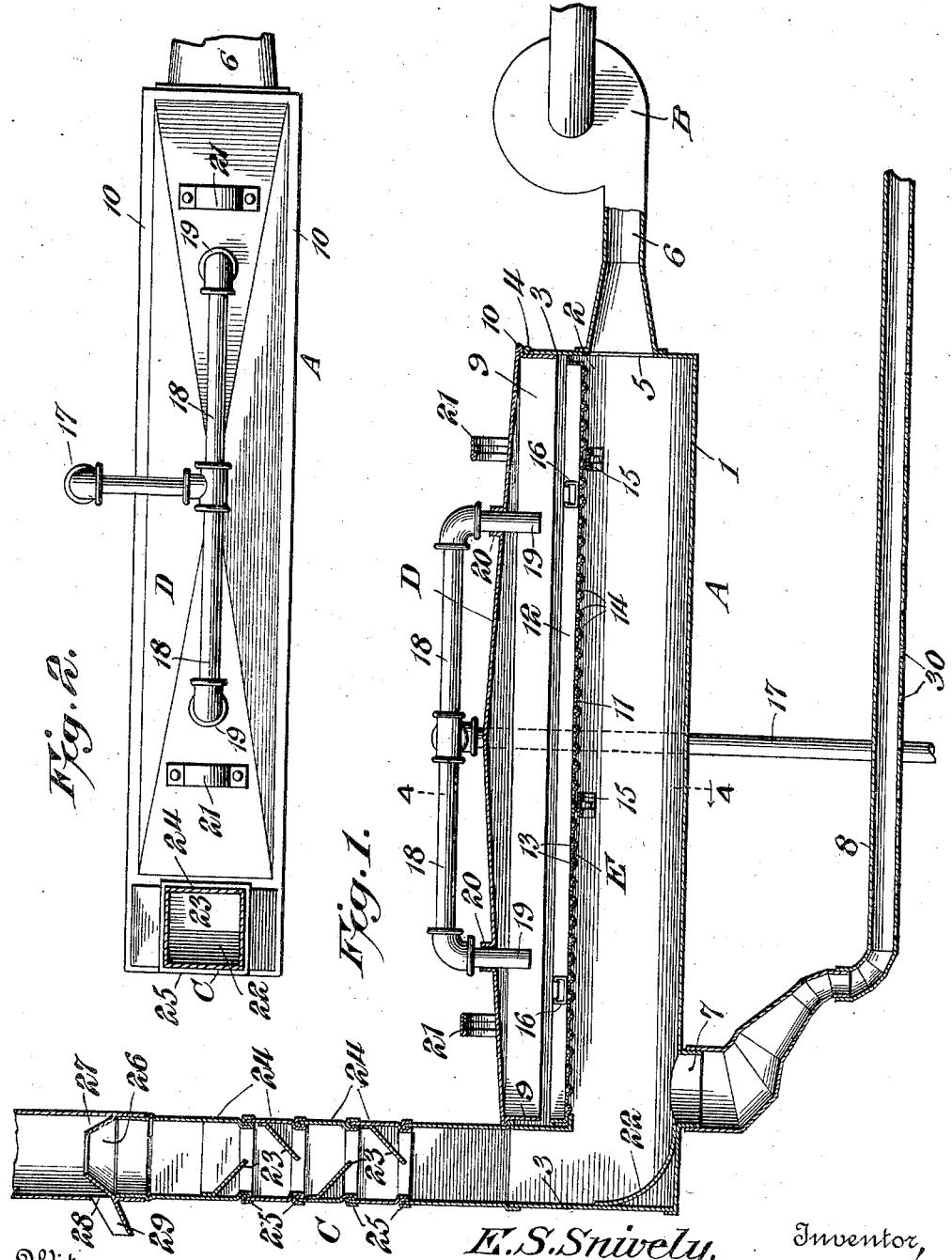

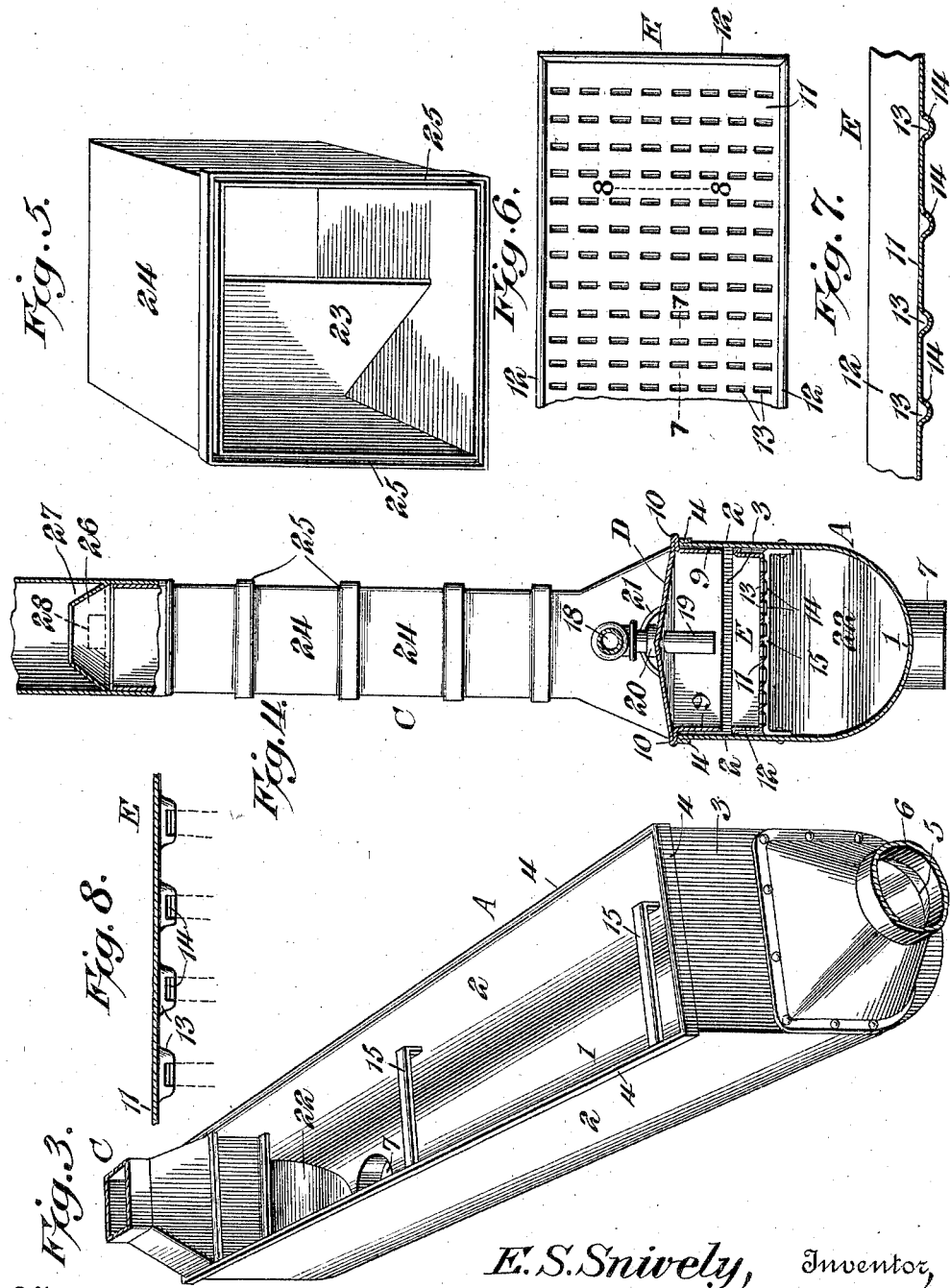

UNITED STATES PATENT OFFICE.

EDWIN S. SNIVELY, OF OMAHA, NEBRASKA, ASSIGNOR TO DAVID COLE CREAMERY COMPANY, OF OMAHA, NEBRASKA, A CORPORATION OF NEBRASKA.

PASTEURIZED-CREAM COOLER AND AERATOR.

965,604. Specification of Letters Patent. Patented July 26, 1910.

Application filed December 18, 1909. Serial No. 533,815.

*To all whom it may concern:*

Be it known that I, EDWIN S. SNIVELY, a citizen of the United States, residing at Omaha, in the county of Douglas and State of Nebraska, have invented certain new and useful Improvements in Pasteurized-Cream Coolers and Aerators, of which the following is a specification.

This invention relates to apparatus designed for use more especially in creameries for the purpose of cooling and aerating cream or milk after passing through the pasteurizer, but it is to be understood that the apparatus may be used in other arts where a liquid is to be cooled and objectionable odors and impurities eliminated.

The invention has for its principal object to provide an apparatus of the character referred to which is highly efficient in operation as to its cooling, aerating and odor and gas eliminating qualities and which is so designed as to handle a continuous supply of cream from the pasteurizer, whereby an exceedingly large volume can be treated in a given time, and in which the parts are so arranged that they can be disassembled for convenience in cleaning to keep the apparatus perfectly sanitary.

Another object of the invention is to provide a novel means for directing the cream into the air blast so that an effective aerating and cooling action can take place within a relatively small chamber.

Another object of the invention is the provision of a novel arrangement of outlet conduits for the aerated and cooled cream and the exhaust air, the exhaust air conduit having deflector means for preventing cream from being entrained from the air and also means for collecting the condensation products and preventing them from passing back into the aerating chamber.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a vertical longitudinal section of the apparatus. Fig. 2 is a plan view thereof. Fig. 3 is a perspective view of the body of the machine. Fig. 4 is a vertical transverse section on line 4—4, Fig. 1. Fig. 5 is a perspective view of a deflector section of the exhaust air outlet or stack. Fig. 6 is a fragmentary plan view of the device for discharging the cream in wide or flat streams into the air blast. Fig. 7 is an enlarged sectional view on line 7—7, Fig. 6. Fig. 8 is an enlarged sectional view on line 8—8, Fig. 6.

Similar reference characters are employed to designate corresponding parts throughout the views.

Referring to the drawings, A designates the body of the machine, which may be made of sheet metal or other suitable material and is constructed in the form of an approximately horizontal trough consisting of a semi-cylindrical bottom 1, vertical side walls 2, and heads or end walls 3, the bottom and side walls being preferably, although not necessarily, made of a single piece of sheet metal, and the entire structure is reinforced at the top by doubling the metal into a rim 4. The head 3 at one end is provided with an opening 5 for receiving the air blast which is supplied by a blower B of any approved construction, which is connected with the opening by a conduit 6. It is preferable to use air of a certain temperature, depending upon the temperature of the cream delivered from the pasteurizer and as the air is taken from the atmosphere and varies with the temperature thereof, it will be necessarily heated in cold weather and cooled in warm weather by any appropriate means not forming part of the present invention. At the end of the body opposite from the air inlet, is an upwardly-extending outlet in the form of a stack C through which the exhaust air passes to the atmosphere, and the bottom of the trough-shaped body is provided with a drain opening or outlet 7 which connects with a distributing pipe or conduit 8 that conducts away the aerated and cooled cream. The body A is open at its top and is provided with a removable cover D that is formed with a depending rim 9 so shaped as to fit within the body A, there being a peripheral bead 10 which forms a shoulder to support the cover in place on the said body.

The body A constitutes a cooling and aerating chamber and is unrestricted throughout its length, so that a blast of air can pass freely therethrough from the blower. Arranged within the chamber is a stream-discharging device designated generally by E which is a pan-shaped structure consisting of a flat bottom plate 11 and an upwardly-extending peripheral rim 12 so as to receive the cream from the pasteurizer. In the present instance, this device E is made in one part, but this is not necessary, and the important feature about the device is the peculiar construction of the bottom plate, whereby the cream will discharge into the air blast in numerous streams which are comparatively wide in a direction transverse to the current of air and narrow in a direction parallel to such current, so that a very effective cooling and aerating action can be obtained. For this purpose, the bottom of the strainer-like device E is provided with closely-arranged depressions 13, and, as shown in Fig. 7, each depression has a lateral opening 14 in the form of a slit disposed with its length transverse to the current of air. These slits 14 are all disposed on the same side of the depressions so that the streams of cream will be discharged into the air blast in a counter-direction or toward the air inlet of the chamber, and furthermore the wide surface of each stream will be transverse to the direction of the air current so that the streams will be broken up into minute particles, and, as a consequence, an efficient aerating and cooling action is obtained. The device E is supported in the body A by horizontal cross members 15 secured to the side walls of the body and serving as braces therefor, and by means of handles 16 on the device E, the same can be readily lifted out of the body for cleaning the apparatus or for any other purpose.

The cream or other liquid to be treated is delivered from the pasteurizer or equivalent device through a pipe 17 which extends upwardly along the side of the body A to a point above the same where it is provided with branches 18 disposed over the cover D, the branches terminating in depending extremities 19 which pass loosely through openings 20 in the cover to deliver the cream upon the stream-forming device E. The cream will thus be distributed more evenly over the apertured bottom plate 11 of the device E so that streams will flow through all the slits or apertures. In order to remove the cover, which is provided with handles 21, the pipe 17 can be raised to disengage the discharging extremities 19 from the openings 20 and after this is done, the cover can be readily lifted off the body of the apparatus.

The discharge opening 7 for the aerated and cooled cream is set inwardly from the head 3 at the discharge end of the body and is also offset from the stack C. In the portion of the chamber between the opening 7 and head 3 is a curved plate 22 which forms a dam or impinging surface that has its concave side presented to the current of air and cream, and it serves to change the direction of the air current so as to pass into the stack C, and some of the cream particles are carried by the air upon this plate so that an aeriform mass may accumulate at this point and build up a wall which will form into ripples at its surface and tend to move upwardly, but the mass of cream adjacent to the plate 22 will flow down by its own weight into the opening 7. By this action, the aerating and cooling of the cream is promoted since the cream is subjected to the action of the air for a longer time than if it passed directly into the outlet opening.

In order to prevent the cream from being carried out of the stack C, the latter is provided with alternately arranged oppositely-inclined baffle plates 23 which will permit the air to readily pass through the stack by way of the zigzag passage formed by the baffle plates, but the cream particles will impinge on the under sides of the baffle plates and evenly drop back into the body A. It is preferable to make the stack in a number of deflector sections 24 which are detachably connected so that the parts can be readily cleaned. As shown in Fig. 5, each section 24 is an approximately hollow rectangular structure having the bottom edges of its metal walls crimped in such a manner as to provide a continuous peripheral groove or pocket 25 so as to receive the top end of an adjacent stack section.

The cream to be treated being delivered directly from the pasteurizer, will be of substantially the same temperature as the latter and the air supplied to the machine will vary from fifty to one hundred and twenty degrees below the temperature of the cream so that considerable condensation will take place in the portion of the stack above the deflector plates 23. In order to prevent the products of condensation from passing back into the cream, a collecting device 26 is arranged in the stack, the said device being in the form of an internal frusto-conical flange which coöperates with the stack to provide an annular collecting chamber 27 or basin which has an outlet opening 28 in the stack, there being a spout 29 at the opening through which the condensation products can be discharged into a suitable collecting receptacle.

In the operation of the apparatus, the cream passes upwardly from the pipe 17 from the pasteurizer and discharges into the device or strainer E from which it discharges into the blast of air from the blower B. This air blast is of sufficient strength to minutely separate the particles of the cream, and as the streams have their surfaces disposed transversely to the direction of the air blast, this breaking up of the cream is greatly facilitated. Some of the particles of the cream drop upon the bottom of the trough and will be forced along the same by the air to the opening 7, while other particles will be carried bodily through the chamber and accumulate at the plate 22 so that a constantly renewing wall will be built up at this point. The wall does not build up sufficiently to obstruct the outlet stack since the cream in proximity to the plate 22 will pass by its own weight into the cream outlet 7. In this manner, the cream passes into the outlet in opposite directions and is delivered by the distributing pipe 8 to a tube or surface cooler of ordinary construction through spaced apertures 30 in the bottom of the pipe. The baffle plates 23 separate any entrained cream particles from the exhaust air so that there will be no waste, and the device 26 operates to prevent condensation products from passing back into the machine.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new and desire to secure by Letters Patent, is:—

1. A cooling and aerating apparatus comprising a horizontally-disposed chamber having an air inlet and an air outlet at opposite ends, means for discharging a blast of air into the chamber through the inlet, the blast traversing the chamber throughout and escaping from the outlet, and a device located within the chamber and extending along and above the path of the blast of air for discharging the liquid to be cooled and aerated in the form of closely-disposed streams into the blast of air, which streams are wider in a direction transverse to the blast.

2. A cooling and aerating apparatus comprising an inclosure, means for discharging a blast of air through the inclosure, and a device arranged to discharge the liquid to be cooled and aerated into the blast of air in individual streams which are wider in a direction transverse to the blast.

3. A cream cooling and aerating apparatus comprising an inclosure, a device for discharging a horizontal blast of air therethrough, and means mounted in the inclosure at a point above the blast and having a plurality of apertures arranged to discharge individual streams of the liquid to be aerated and cooled in a direction toward which the blast is received.

4. A cooling and aerating apparatus comprising an inclosing structure, means for discharging a blast of air therethrough, a substantially horizontal plate mounted in the structure and having a plurality of slits extending transversely to the direction of the blast, said plate being supported above the path of the blast, and means for discharging upon the plate the liquid to be cooled and aerated whereby the said liquid flows into the blast in transversely widened streams.

5. A cooling and aerating apparatus comprising a chamber, means for discharging a blast of air therethrough, a substantially horizontal plate mounted in the chamber above the path of the blast and provided with depressions each having at the side nearest to the said means a slit extending transversely to the blast for delivering into the latter the liquid to be treated, and means for discharging the liquid upon the said plate.

6. A cooling and aerating apparatus comprising a chambered structure having an air inlet at one end and an air outlet at the opposite end, a device occupying the space in the top of the chambered structure between the inlet and outlet consisting of a pan-like structure having a plurality of slits in its bottom, and means connected with the inlet for discharging a blast of air through the chamber and under the said device, said pan-like structure being arranged in a substantially horizontal position entirely above the horizontal plane of the air inlet.

7. A cooling and aerating apparatus comprising a chambered structure having an air inlet at one end and an air outlet at the opposite end, a device between the inlet and outlet consisting of a pan-like structure having a plurality of slits in its bottom, means connected with the inlet for discharging a blast of air through the chamber and under the said device, and means disposed above the device for supplying liquid thereto, the bottom of the said pan-like structure being substantially on a line with the top wall of the air inlet and the inner wall of the air outlet so as not to obstruct the passage of the blast of air.

8. A cooling and aerating apparatus comprising a chambered structure having an air inlet at one end and an air outlet at the opposite end, a device fitting in and closing the space at the top of the chambered structure between the inlet and outlet consisting of a pan-like structure having a plurality of slits in its bottom, means connected with the inlet for discharging a blast of air through the chamber and under the said device, a cover for the said chambered structure, and means extending through the cover for discharging liquid to the said device.

9. A cooling and aerating apparatus comprising an oblong chambered structure having an air inlet at one end and an air outlet at the opposite end, a device occupying the space in the said chambered structure between the inlet and outlet consisting of a pan-like structure having a plurality of slits in its bottom, means connected with the inlet for discharging a blast of air through the chamber and under the said device, said chambered structure having an opening in its top disposed between the said inlet and outlet, a cover for the opening, and a conduit for the liquid to be aerated and cooled, said conduit discharging between the cover and said device, the latter being arranged below the cover and forming the top of the blast chamber.

10. A cooling and aerating apparatus comprising a chambered structure having an air inlet at one end and an air outlet at the opposite end, a device occupying the space between the inlet and outlet consisting of a removable pan-like structure having a plurality of slits in its bottom, means connected with the inlet for discharging a blast of air through the chamber and under the said device, said chambered structure having an opening in its top disposed between the said inlet and outlet, a removable cover for the opening arranged above the said device, and a supply pipe having a plurality of branches at its discharge end leading into the chambered structure through the said cover and terminating at a point above the said device to deliver thereto the liquid to be cooled and aerated.

11. A cooling and aerating apparatus comprising a trough-like casing open at its top and having inlet and outlet openings for air at opposite ends, a removable cover therefor, a removable strainer-like device arranged below the cover in spaced relation to the bottom of the casing and forming with the bottom and sides of said casing a closed blast chamber, said device having a plurality of closely-arranged slits, means for discharging air through the inlet of the casing between the bottom thereof and said device, and means for delivering liquid to the device from which the liquid flows through the slits into the air blast.

12. An apparatus of the class described comprising a casing having an air inlet at one end and separate upper and lower outlets at the opposite end for the exhaust air and cooled aerated liquid respectively, means for discharging a blast of air into the casing through the said inlet, and a device located within the top of the casing in the space between the inlet and outlets for delivering into the blast of air the liquid to be cooled.

13. An apparatus of the class described comprising a casing having an air inlet at one end and separate upper and lower outlets at the opposite end for the exhaust air and cooled aerated liquid respectively, means for discharging a blast of air into the casing through the said inlet, and a horizontally disposed device mounted in the top of the casing in the space between the inlet and outlets at a point above the path of the air blast and having a plurality of slits extending transversely to the air blast for discharging into the latter the liquid to be cooled and aerated.

14. An apparatus of the class described comprising a casing having an air inlet at one end and separate upper and lower outlets at the opposite end for the exhaust air and cooled aerated liquid respectively, means for discharging a blast of air into the casing through the said inlet, and a pan-shaped device mounted in the casing at a point between the inlet and outlets and above the path of the air blast, the bottom of the device being provided with closely arranged depressions having openings in the sides nearest the inlet and extending transversely to the path of the air blast.

15. A cooling and aerating apparatus comprising a casing having an upper air outlet at one end and a lower liquid outlet disposed inwardly from the same end, means for discharging a blast of air into the casing from the opposite end and through the upper outlet, and means for discharging the liquid to be cooled and aerated into the blast of air from the top while passing through the casing whereby the said liquid is conducted to the lower outlet.

16. A cooling and aerating apparatus comprising a casing having an air outlet in its top at one end and a liquid outlet in its bottom disposed inwardly from the said end, means at the opposite end of the casing for discharging a blast of air therethrough, means for delivering into the blast of air the liquid to be cooled and aerated, and a device between the bottom outlet and adjacent end of the casing on which the aerated and cooled liquid accumulates and finally discharges through the bottom outlet.

17. A cooling and aerating apparatus comprising a substantially horizontal casing, a blower connected with one end of the casing, an outlet conduit extending from the top of the casing at the end thereof opposite the blower, a liquid drainage conduit at the bottom of the casing offset from the first-mentioned conduit, a plate disposed between the receiving end of the drainage conduit and the adjacent end wall of the casing, said plate being curved and having its concaved side disposed to receive a blast of air from the blower, and means for discharging into the blast of air a plurality of streams of the liquid to be cooled and aerated.

18. A cooling and aerating apparatus comprising a trough-like casing, a downwardly-discharging liquid outlet conduit adjacent one end of the casing, an upwardly-discharging air outlet conduit at the same end of the casing, means at the opposite end of the casing for discharging a blast of air therethrough, means for delivering into the blast of air the liquid to be cooled, and a wall disposed between the receiving ends of the said conduits for directing air into the upwardly-discharging conduit and liquid into the downwardly-discharging conduit.

19. A cooling and aerating apparatus comprising a trough-like casing, a blower connected to one end of the casing for delivering a blast of air therethrough, an upwardly-discharging exhaust air conduit at the opposite end of the casing, an outlet conduit in the bottom of the casing arranged near the end opposite from the blower and arranged to receive liquid impelled along the bottom of the casing by the draft of air, a device disposed between the two conduits on which the aerated and cooled liquid accumulates and gradually flows therefrom into the liquid outlet conduit, and means for discharging into the blast of air a plurality of streams of liquid to be cooled and aerated.

20. A cooling and aerating apparatus comprising a casing, means for discharging a blast of air therethrough, means for delivering to the blast the liquid to be cooled and aerated, an upwardly-discharging outlet conduit for the exhaust air, and means in the conduit for separating entrained liquid from the air.

21. A cooling and aerating apparatus comprising a casing, means for discharging a blast of air therethrough, means for delivering to the blast the liquid to be cooled and aerated, an upwardly-discharging outlet conduit for the exhaust air, means in the conduit for separating entrained liquid from the air, and a device in the conduit above the said last means for collecting the condensation products.

22. A cooling and aerating apparatus comprising a casing, means for delivering a blast of air therethrough, a device for delivering to the blast the liquid to be cooled and aerated, a stack leading from the casing at the end thereof opposite from the said means, oppositely-disposed alternately-arranged deflector plates in the stack, and means in the stack above the deflector plates for collecting condensation products.

23. A combined cooling and aerating apparatus consisting of a chamber in which cream or the like is cooled and aerated, a stack connected with the casing for the exhaust air, said stack consisting of detachably connected sections, and deflector devices mounted in the sections of the stack for separating entrained cream from the air passing out of the stack.

24. A combined cooling and aerating apparatus consisting of a chamber in which cream or the like is cooled and aerated, a stack connected with the casing for the exhaust air, said stack consisting of detachably connected sections, deflector devices mounted in the sections of the stack for separating entrained cream from the air passing out of the stack, and means in the stack above the said deflecting means for collecting condensation products and preventing the same from flowing back into the chamber.

25. A cooling and aerating apparatus comprising a substantially horizontal casing, a blower connected with one end for discharging a blast of air therethrough, an upwardly-discharging air outlet stack connected with the end of the casing opposite from the blower, a drainage conduit connected with the bottom of the casing at the end thereof adjacent the stack, means in the casing between the stack and blower for discharging into the draft of air streams of liquid to be cooled and aerated, a device disposed between the receiving end of the stack and the drainage conduit for permitting the aerated and cooled liquid to accumulate thereon and finally flow into the drainage conduit, said stack being composed of detachably connected sections each having a baffle plate arranged at an opposite inclination to the baffle plate of an adjacent section for separating entrained liquid particles from the air passing through the stack, and means arranged in the stack above the uppermost deflector plate for collecting condensation products and preventing them from returning to the casing.

26. A cooling and aerating apparatus comprising a casing, means for discharging a blast of air therethrough, means for delivering to the blast the liquid to be cooled and aerated, an upwardly-discharging outlet conduit for the exhaust air, and means in the conduit for separating entrained liquid from the air and consisting of oppositely-disposed alternately-arranged deflectors.

27. A cooling and aerating apparatus comprising a casing having an air outlet in its top at one end and a liquid outlet in its bottom disposed inwardly from the said end, means at the opposite end of the casing for discharging a blast of air therethrough, means for delivering into the blast of air the liquid to be cooled and aerated, and a device in the nature of a dam located at the end of the casing between the bottom of the air outlet and upper end of the liquid outlet and on which device the aerated and cooled liquid accumulates before it is finally discharged through said liquid outlet.

28. A cooling and aerating apparatus comprising a chamber, means for discharging a blast of air therethrough from one end of the chamber, a substantially horizontal plate mounted in the chamber above the path of the blast and provided with depressions, each having an opening in the form of a slit disposed with its length transverse to the current of air, said slits being all located on that side of the depressions which faces the air blast so that the streams of liquid will be discharged into the air blast toward the air inlet of the chamber, and means for discharging the liquid upon the said plate.

29. A cooling and aerating apparatus comprising a trough-like structure with a bottom, sides and ends all closed, and an open top, a liquid outlet leading from the bottom near one end, an air inlet at the opposite end of the structure, an air outlet leading from the top at the same end as the liquid outlet, a device in the nature of a dam between the air outlet and the liquid outlet and located directly in line with the blast of air coming in at the opposite end of the structure, and means for delivering the liquid in fine streams at the top of and transversely to the blast of air.

30. A cooling and aerating apparatus comprising a trough-like structure with a bottom, sides and ends all closed, and an open top, a liquid outlet leading from the bottom near one end, an air inlet at the opposite end of the structure, an air outlet leading from the top at the same end as the liquid outlet, and a pan-shaped device mounted in the open top of the structure and being perforated throughout and filling the space between the air inlet and the air outlet and lying in a horizontal plane above the top of the blast, and means for delivering liquid above said device.

31. A cooling and aerating apparatus comprising a trough-like chamber which is closed at the bottom and ends and is provided with an open top, a liquid outlet near one end of the chamber at the bottom, an air outlet at the same end of the chamber at the top, an air inlet at the opposite end of the chamber, means for discharging a blast of air through the inlet, a device located between the air inlet and air outlet and closing the said open top and forming the top of the chamber for the blast, and means for delivering liquid to the chamber above the said device, the latter being perforated throughout so as to deliver to the top of the blast streams of liquid from the inlet to the outlet of the chamber.

In testimony whereof I affix my signature in presence of two witnesses.

EDWIN S. SNIVELY.

Witnesses:
MABEL C. MILES,
S. S. HAMILTON.